April 13, 1965  L. C. WHEAT  3,178,041
SHEET HANDLING APPARATUS
Filed Oct. 23, 1961  5 Sheets-Sheet 1
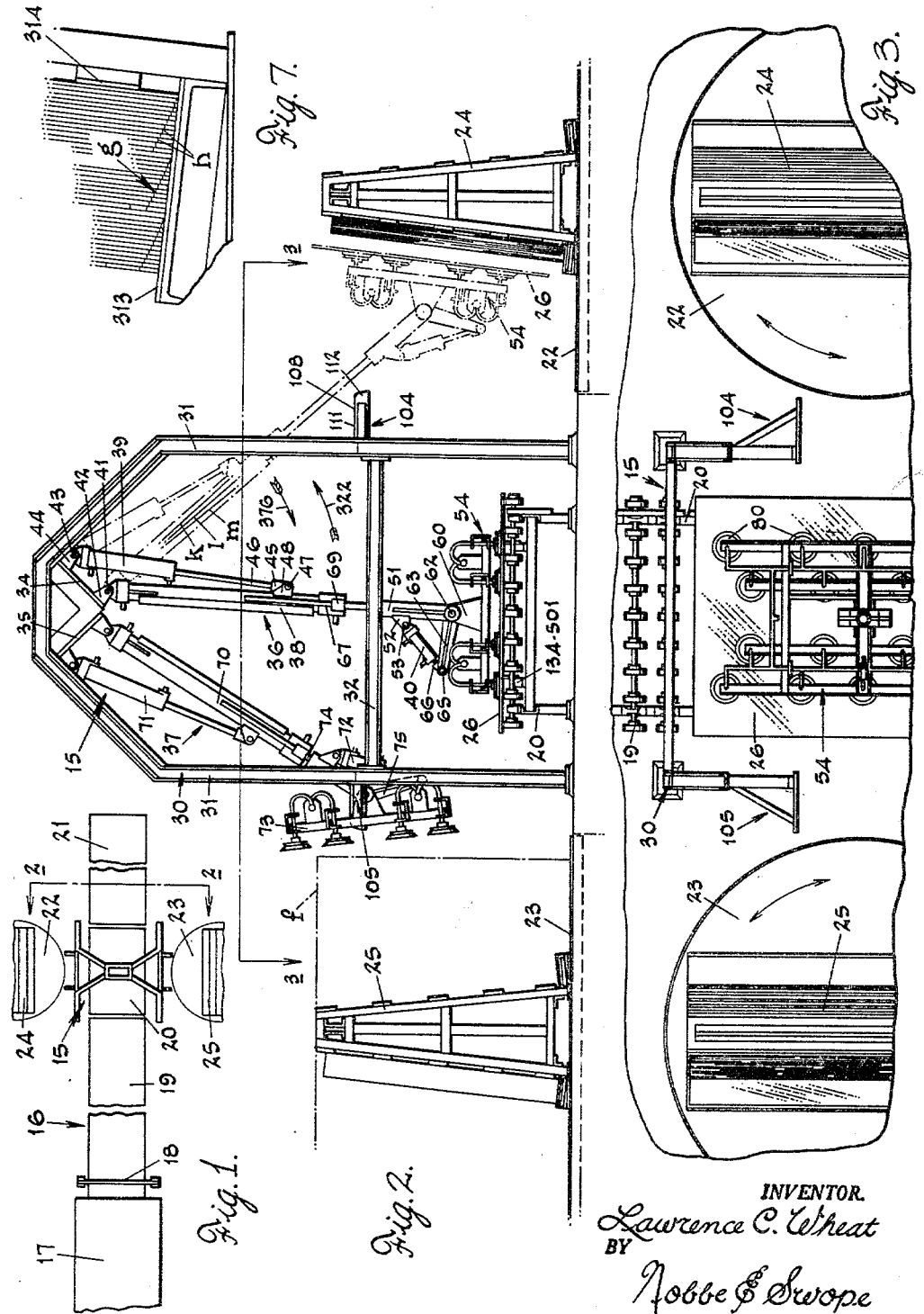
INVENTOR.
Lawrence C. Wheat
BY
Nobbe & Swope
ATTORNEYS April 13, 1965   L. C. WHEAT   3,178,041
SHEET HANDLING APPARATUS
Filed Oct. 23, 1961   5 Sheets-Sheet 2

INVENTOR.
Lawrence C. Wheat
BY
Nobbe & Swope
ATTORNEYS

April 13, 1965 L. C. WHEAT 3,178,041
SHEET HANDLING APPARATUS
Filed Oct. 23, 1961 5 Sheets-Sheet 3

INVENTOR.
Lawrence C. Wheat
BY
Hobbe & Swope
ATTORNEYS

INVENTOR.
Lawrence C. Wheat
BY
Nobbe & Swope
ATTORNEYS

INVENTOR.
Lawrence C. Wheat
BY
Nobbe & Swope
ATTORNEYS

United States Patent Office 3,178,041
Patented Apr. 13, 1965

3,178,041
SHEET HANDLING APPARATUS
Lawrence C. Wheat, Toledo, Ohio, assignor to Libbey-Owens-Ford Glass Company, Toledo, Ohio, a corporation of Ohio
Filed Oct. 23, 1961, Ser. No. 146,852
14 Claims. (Cl. 214—7)

The present invention relates broadly to handling apparatus for sheet material and more particularly has to do with improved apparatus for automatically handling individual sheets or plates and properly stacking them for subsequent use.

Although in no way restricted thereto, the novel apparatus of this invention has been used to considerable advantage in the handling and stacking of relatively large sheets or plates of glass. As is known in the glass art, a glass ribbon, produced either for use as plate glass or window glass, is moved forwardly from the area of its formation through an annealing lehr at the end of which the ribbon is transversely scored and broken into individual sheets or plates. In most instances, the individual sheets are then carried along a horizontally disposed conveyor until they can be removed for further processing or for storage purposes. Normally these sheet removing operations have been carried out by production workers who, with a conventional frame equipped with vacuum cups, remove a sheet from the conveyor, load it on a buck and then return with the empty frame to the conveyor. This is of course a repetitious type of labor requiring several workmen who must constantly remain in the transfer area and also exercise considerable care to prevent the breakage of glass during the handling and loading of the sheets in stacked relation to one another. As herein provided, the apparatus of this invention and the control system through which it is caused to automatically operate, not only relieves the need for several operators but repeats the transfer of glass sheets from the conveyor in timed relation to their movement therealong and sequentially alternates the direction in which the sheets are removed from the conveyor whereby the sheets can be stacked on bucks or other support apparatus positioned at opposite sides of the conveyor.

A primary object of this invention therefore is to provide improved handling apparatus adapted to automatically remove large sheets or plates of glass or other materials in succession from a conveyor and to selectively transfer the sheets or plates to bucks or other support apparatus arranged at opposite sides of the conveyor.

Another object of the invention is to provide, in sheet handling apparatus of the above character, transfer means for removing a given number of sheets from a horizontal conveyor and stacking them in a substantially vertical position on a support apparatus at one side of the conveyor and automatically operable to then remove a given number of sheets from the conveyor and stack them on a support apparatus at the opposite side of the conveyor.

Another object of the invention is to provide, in sheet htandling apparatus of the above character, transfer means including a pair of vacuum frames and separate means for supporting said vacuum frames for swinging movement about horizontal axes, means for controlling the operation of one vacuum frame to successively pick up a given number of sheets from the conveyor and stack them in a substantially vertical position at one side of the conveyor, and means operable when the stack contains said given number of sheets to stop the operation of said vacuum frame and initiate the operation of the second vacuum frame to pick up a given number of sheets from the conveyor and stack them in a substantialy vertical position at the opposite side of said conveyor.

Another object of the invention is to provide sheet handling apparatus in which, after removing a given number of sheets from the conveyor, the vacuum frame is automatically brought to a rest position above and to one side of the conveyor and the other vacuum frame is moved from a rest position into position to successively remove a given number of sheets from the conveyor.

A further object of the invention is to provide sheet handling apparatus of the above character in which electrically operated emergency control means is provided for halting the operation of either of the pair of vacuum frames before the total of a given number of sheets has been removed from the conveyor, for starting operation of the other of the pair of vacuum frames to remove a given number of sheets from the conveyor and for then causing the first vacuum frame to resume operation to complete the removal of the remainder of the given number of sheets.

A further object of the invention is to provide sheet handling apparatus of the above character in which the alternate operation of the two vacuum frames is automatically and electrically controlled.

A further object of the invention is to provide sheet handling apparatus of the above character in which the operation of each vacuum frame to remove a given number of sheets from the conveyor is automatically initiated in response to the entry of successive sheets into the transfer area.

A still further object of the invention is to provide sheet handling apparatus of the above character in which electrically operated means is provided for automatically varying the outward and upward swinging movement of each vacuum frame relative to the respective stack of sheets to compensate for the increasing thickness of said stack of sheets.

Other objects and advantages of the invention will become more apparent during the course of the following description when read in connection with the accompanying drawings.

In the drawings, wherein like numerals are employed to designate like parts throughout the same:

FIG. 1 is a schematic view of the handling apparatus as employed in connection with a sheet material conveyor line;

FIG. 2 is an end elevation of handling apparatus constructed in accordance with the invention and as taken on line 2—2 of FIG. 1;

FIG. 3 is a horizontal view taken on line 3—3 of FIG. 2;

FIG. 7 is a schematic view of the manner of stacking sheet material;

Figures 4, 6:
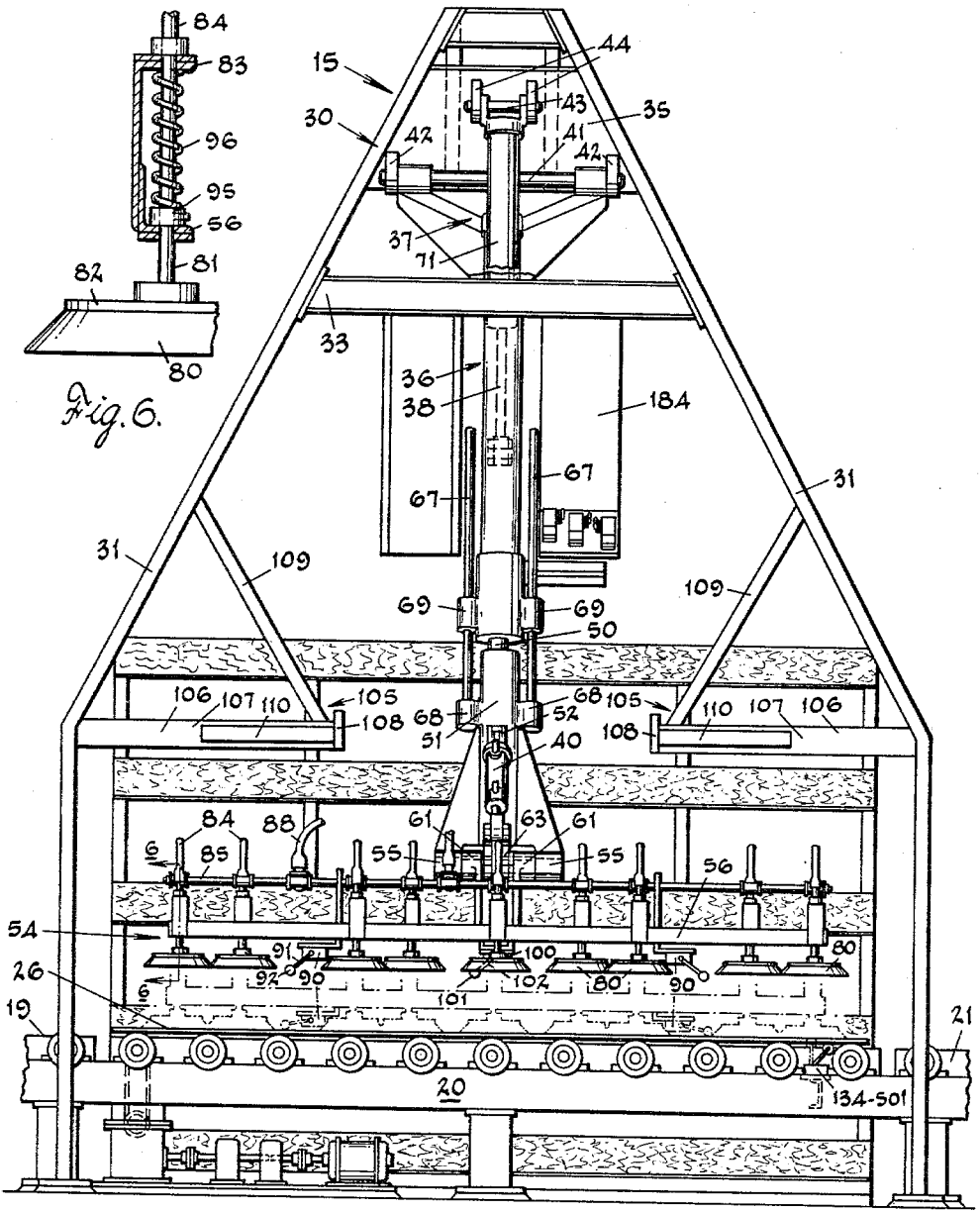
FIG. 4 is a side elevation of the handling apparatus as viewed from the left of FIG. 2.
FIG. 6 is a vertical sectional view taken on line 6—6 of FIG. 4.

Referring now more particularly to FIG. 1 there is shown a handling apparatus as constructed in accordance with the invention and designated in its entirety by the numeral 15. The apparatus 15 is shown in connection with a roll conveyor line 16 continuing outwardly from the exit end of an annealing lehr 17 for sheets or plates of glass which are scored and "capped" or broken from the main body of a continuous glass ribbon issuing from the lehr by a cutting device generally designated by the numeral 18. Although cutting devices employed for such purposes form no part of the invention, one of the type disclosed in the Drake patent, No. 2,033,188, has been used to advantage for this purpose. The sheets are automatically cut in this area to a predetermined length and thus are individually carried forwardly on the section 19 of the roll conveyor 16. The conveyor section 19, for reasons to be hereinafter more fully described, is driven from one source of power while a succeeding conveyor section 20, over which the handling apparatus 15 is installed, is operated from an independent source of power. Likewise, a run-out conveyor section 21, adjoining the opposite end of section 20, is adapted to be operated by its own source of power. Transversely positioned with respect to the roll conveyor 16 and on opposite sides of the section 20, there are provided two mechanically operated turn-table platforms 22 and 23 on which are temporarily located support apparatus or bucks designated at 24 and 25.

Generally stated, the glass sheets or plates 26, carried along the roll conveyor sections 19, are advanced onto the conveyor section 20 and actuate controls to halt said conveyor section. The controls also activate the handling apparatus whereby the present sheet will be picked up, removed from the conveyor and stacked in a substantially vertical position on the buck 24 on platform 22. When a predetermined given number of sheets have been stacked on one side of buck 24, operation of the apparatus is reversed to alternately remove a succeeding predetermined given number of sheets and stack the same in a substantially vertical position on one side of buck 25 on platform 23. While this second stacking operation is in progress, a turn-table platform 22 is caused to rotate to present the opposite and empty side of buck 24 for the reception of a subsequent plurality of sheets. Of course, as the bucks are properly loaded with stacked sheets on both sides, they are removed and replaced on the respective platforms by empty bucks. In the event of sheet breakage or temporary adjustment of the handling apparatus, the controls effecting temporary stoppage of the conveyor section 20 are rendered inoperable whereupon the conveyor section 21 is put into use with the result that the glass sheets successively entering the conveyor section 20 will be carried thereover to the section 21 from which said sheets can be removed for storage or disposed of otherwise in case they have been found to be broken.

As shown in FIG. 2, the handling apparatus 15 includes a vertical frame structure 30 having side members 31 and horizontally disposed braces 32 and 33. The upper end of the frame 30 is equipped with angularly disposed structural panels 34 and 35 on which the transfer means or sheet handling members, designated generally by the numerals 36 and 37, of the handling apparatus are supported. The sheet handling members are identical in construction and it is believed that the description of one will suffice for both; specific reference to each of the handling members being suitably designated. Thus, the handling member 36 includes a "lift" cylinder 38, a "swing" cylinder 39 and a "tilt" cylinder 40. In this arrangement, the cylinder 38 is pivotally supported at its upper end by an axle 41 journaled in brackets 42 secured to the panel 34 and the cylinder 39 is supported in like manner by an axle 43 in brackets 44 on panel 34. The cylinder 39 is operatively connected to the cylinder 38 by means of a clevis block 45 attached to the outer end of the associated piston rod 46; said block 45 being journaled on an axle 47 carried by brackets 48 affixed to the case of cylinder 38. The outwardly directed end of piston rod 50 associated with cylinder 38 is provided with fixedly secured sleeve 51 equipped with brackets 52 on which one end of the cylinder 40 is supported by axle pin 53. As viewed in FIG. 5, the end of sleeve 51 is equipped to carry a vacuum frame 54. For this purpose, the sleeve end is formed with spaced trunnion members 55 that are axially aligned in the line of a plane at a right angle to the longitudinal axis of the piston rod 50.

Figure 5:
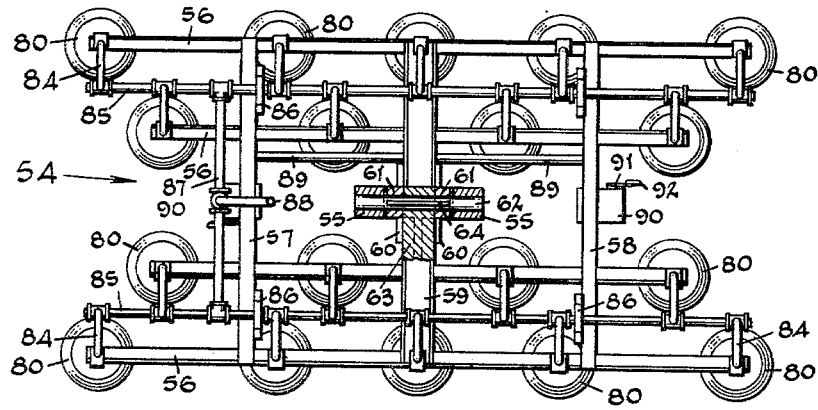
FIG. 5 is a plan view of a vacuum frame employed in the handling apparatus.

The vacuum frame 54, as shown in FIG. 5, comprises spaced frame members 56, arranged generally in parallel with one another, and transverse brace members 57 and 58. Medially between the braces, a substantially more rigid channel member 59 is positioned and secured to the several frame members. In the central area of the frame 54, the member 59 is provided on its vertically disposed walls with upwardly directed flange plates 60 (FIG. 2) equipped at their upper ends with bearing collars 61. The collars are received on a shaft 62, journaled in the trunnion members 55 and on which one end of a lever 63 is also carried. As shown in FIG. 5, a bar key 64 is located in the shaft 62 and mechanically related to the bearing collars 61 and lever 63 so that they will swing with the shaft substantially as a unit. The outer end of lever 63 is formed as at clevis 65 to receive the end of piston rod 66 of cylinder 40. The vacuum frame 54 and piston rod 50 are restrained from axial rotation relative to the cylinder 38 and more particularly to the conveyor 20 or a sheet 26 thereon by means of guide rods 67 fixedly secured at their lower ends in bosses 68 integrally formed with the sleeve 51 and slidably supported adjacent their upper ends by bosses 69 integrally formed on the cylinder 38. The rods 67 operate to maintain the longitudinal axis of the frame 54 substantially parallel with the longitudinal axis of the conveyor and thereby insures that the frame will not rotate which would prevent proper engagement with a glass sheet and subsequent placement of the sheet on a storage buck.

Upon further examination of FIG. 2, it will thus become apparent that upon the application of pressure to the respective ends of cylinder 38, the vacuum frame 54 can be raised or lowered. Likewise, when pressure is applied to the respective ends of cylinder 39, the same will effect swinging movement of the cylinder 38 as between the illustrated full line and broken line positions thereof. Similarly, the cylinder 40 can be operated to swing the lever 63 thereby tilting the vacuum frame 54 angularly in radial motion about the axis of shaft 62. This permits the frame to be readily disposed in a substantially horizontal plane as in full line or oriented in any plane inclined to the perpendicular as indicated in broken line.

The handling member 37, as aforementioned, is constructed similarly to the member 36, above described, in all respects and thus can be generally said to include a lift cylinder 70, a swing cylinder 71 and tilt cylinder 72. A vacuum frame 73 is swingably supported at the end of piston rod 74 of cylinder 70 and is associated with a lever 75. As in the case of lever 63 and cylinder 40, the lever 75 is adapted to tilt the frame 73 in response to effective pressures in the cylinder 72.

Referring again to the vacuum frame structures, shown in FIGS. 4, 5 and 6, it may be said that the frames 54 or 73 are the same in structure. Thus as viewed in FIGS. 5 and 6, the frame members 56 support a plurality of regularly spaced vacuum cups 80 that are mounted for sliding movement relative to the respective frame members. Thus the pipe or stem 81, that is attached to the backing plate 82 to which the cups are affixed, is passed upwardly through opening in the member 56 and an aligned opening in a vertically disposed bracket 83. Above the bracket 83, the pipe or stem 81 of each vacuum cup is attached in conventional manner to a length of rubber tubing 84 communicating with supply pipes 85 supported on the frame by plates 86. The supply pipes 85 are interconnected by a transversely disposed pipe 87 connecting through tubing 88 to a source of vacuum. Additionally, each vacuum frame is provided with longitudinally directed bars 89 arranged between the braces 57–58 and the channel member 59.

Figure 8:
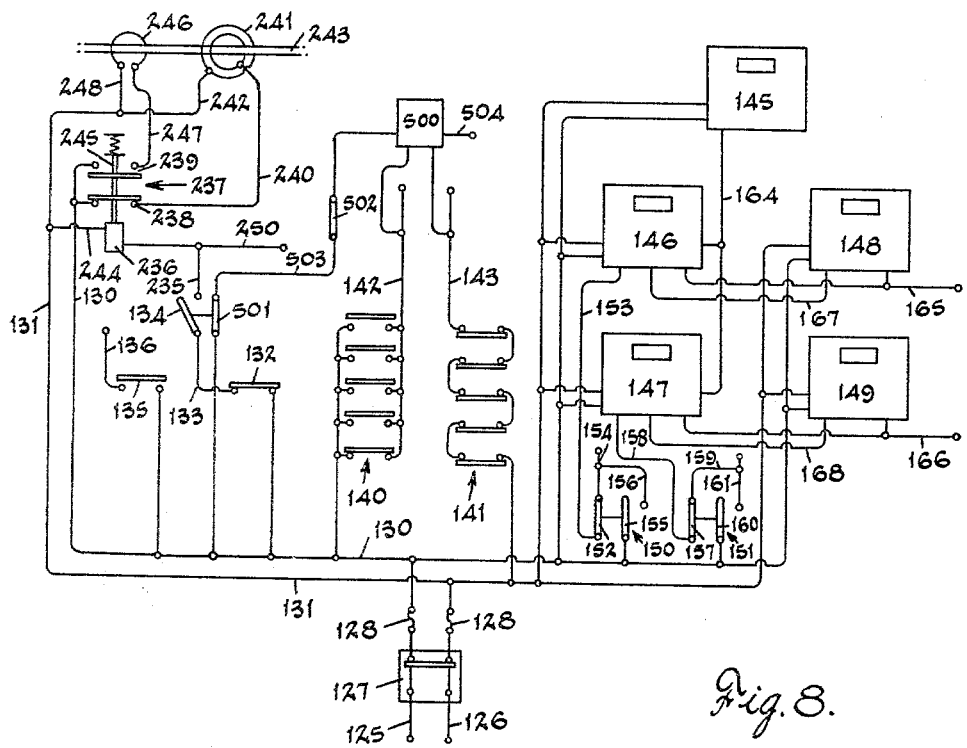
FIG. 8 is a diagrammatic view of electrical circuits employed in the automatic and manual control of operation of the sheet handling apparatus.

As also seen in FIGS. 4 and 5, a series of limit switches are mounted on the vacuum frames. More particularly limit switches 90, carried by brace members 57 and 58 of the frame 54, are each provided with an actuator arm 91 having a soft contactor roll 92. The arms and rolls are adjusted to actuate the respective switches when the frame is located in the broken line position of FIG. 4 and the vacuum cups are in contact with the upper surface of the glass sheet 26. It is to be noted that as the cups are severally urged into surface engagement that they are moved upwardly relative to the frame or, more specifically, the frame is urged downwardly to insure positive vacuous gripping action by the cups. For this purpose, as in FIG. 6, each stem 81 carries an adjustable lock collar 95 above the frame member 56 and a tension spring 96 is interposed between the collar 95 and the undersurface of the bracket 83. Thus, as the frame urges the cups 80 in positive engagement with the glass surface, the stems 81 thereof will move vertically relative to the frame until the switch arms 91 effect operation of the switches 90. This acts to halt downward motion of the frame while simultaneously connecting the plurality of the vacuum cups to the vacuum source. The switches 90, as described in connection with FIG. 8, are connected in parallel to insure completion of a circuit through at least one of the switches when the vacuum cups 80 are engaged with a glass sheet. Of course, as the frame lifts the glass sheet 26 from the roll conveyor 20, as will be more fully hereinafter set forth, the plurality of springs 96 act to move the associated vacuum cups outwardly with respect to the frame or as shown in full line in FIG. 4.

A second switch 100 is carried on the centrally disposed brace member 59 of the frame and by reason of its circuited connection in the control system is inoperable during motion of the frame, in either direction, as viewed in FIG. 4. On the other hand, when the glass sheet 26 has been removed from the conveyor 20 and transferred so as to be located on a buck in stacked relation to a preceding sheet of glass, the frame 54 will again be moved until the vacuum cups are urged inwardly and it is at this time that the roll contactor 101 on the arm 102 of switch 100 causes actuation of the same. Switch 100 is preferably located in the central area of the frame 54 to insure that the sheet will be placed in full surface contact with a previously stacked sheet before the vacuous support afforded by the cups 80 is relieved. Since each of the cups 80 are slidable relative to the frame 54 against the pressure of spring 96, any misalignment of a buck which would create a possibility for one end area or another of the sheet or plate to come into contact with previous sheet and thus actuate the switch is materially reduced. Individual sliding or inward shifting of the cups therefore enables the frame to tilt slightly to place the sheet in full surface contact and thereby be moved bodily against the previously placed sheet until the switch 100 is engaged. Briefly, the switch is then operable to halt movement of the handling member 36, close the vacuum supply to the cups 80 and then start return movement of the frame 54 toward the loading position thereof above the roll conveyor.

The frame 30 of the apparatus is equipped with support structures 104 and 105 as shown in FIGS. 2 and 3 for the purpose of locating the alternatively idle handling member in a rest position. The pressure systems for the idle handling member are controlled automatically or manually to move the associated "lift" cylinder by the "swing" cylinder and to tilt the vacuum frame by the "tilt" cylinder until the above described bar 89 of the respective frame is supported on the upper surfaces of the support structures 104 or 105 as the case may be. This reduces the tendency for expected leakage in the hydraulic systems to cause "relaxation" of the swing cylinders 39 or 71 so that the frame weight would gradually cause the handling member to undesirably move into the loading area above the conveyor and interfere with the operating handling member. Another reason for positively supporting the idle handling member in a rest position is to locate the same above the area through which the ends of a buck will move as it is turned by the turn-table on which it is supported. This is indicated at "f" by broken line in FIG. 2 in connection with the buck 25.

The support structures 104 or 105 include a pair of horizontally disposed, L-shaped frames 106 (FIGS. 3 and 4); each frame formed by a base leg 107, projecting from a side member 31 and to which one end of the leg is secured, and an outwardly directed leg 108. The legs 107 in each instance are reinforced by a brace 109 positioned between the adjacent side member 31 and said leg and a brace 110 secured at its ends to the leg 107 and leg 108. The upper edges 111 of the legs 108 constitute the support surfaces for receiving the associated handling member. In each instance, the outer end of legs 108 is provided with an outwardly and downwardly curved surface 112 (FIG. 2) over which the bar 89 of the respective vacuum frame 54 or 73, will easily be carried as the frame is moved toward the rest position and from which the bar can be removed when the frame is moved into its operative position.

In practical use, each of the sheet handling members 36 and 37 are normally employed in alternating cycles of operation which are monitored by an electric control system. Within this electrical system, there is provided individual circuits for the sequential operations of the cylinders of each of the handling members and an automatic-manual circuitry for causing first one and then the second of the individual circuits to become active. As herein contemplated, each handling member is controlled by its individual circuitry to transfer sheets in one direction from the conveyor 20 and successively repeat the operation to stack a given number of sheets, as for example 42 sheets, in a substantially vertical position on an adjacent buck and then move to a rest position while the other handling member is automatically put into operation to continue the stacking operation by transferring a like given number of sheets from the conveyor in the opposite direction. The total number of sheets transferred by each handling member is recorded in a counting device which then becomes instrumental in discontinuing the related electrical circuit and completing the electric service to the opposite electrical circuit. Since emergencies of one nature or another are normally to be expected, the automatic electric controls of the individual circuitries can be disrupted by the intervention of manual controls thereby insuring that removal of the sheets from the conveyor 20 need not be interrupted.

In order that operation of one of the sheet handling members 36 or 37 can be followed in sequence through one operative cycle with the requisite functioning of the necessary switch controls and valves, reference is now made to FIGS. 8, 9, 10 and 11 wherein exemplary forms of electrical circuits and hydraulic systems have been combined in diagrammatic representation. As viewed in FIG. 8, a series of circuits are illustrated for operational control of the conveyor 20, control of the electric circuits for the handling members 36 and 37, automatic control of their alternate cycles of operation and optional manual control of such alternate cycles. Thus, the electric power lines 125 and 126 are completed through manual switch 127 and fuses 128 to service lines 130 and 131. Through closed switch 132, a circuit is completed by line 133 to one side of limit switch 134 which is mounted on the conveyor 20 so as to be engaged by a sheet 26.

Presently open switch 135 can be employed to complete a circuit through line 136 to control operation of the adjoining conveyor 21 and although this control feature forms no part of the instant invention it has been mentioned hereinabove that the operation of the conveyor 20 will not be halted by the operation of switch 134 if a series of glass sheets are to be run out on the conveyor 21. Thus upon manually opening switch 132, the circuit of line 133 and limit switch 134 will be broken while the closure of switch 135 will place the conveyor 21 in operation.

A plurality of "start" switches 140 are provided as well as a like number of "stop" switches 141; these being suitably located in the vicinity of the handling apparatus to permit immediate termination and/or resumption of full operation of the apparatus. Accordingly, any of switches 140 are adapted to complete a circuit through supply line 142 and any of the normally closed switches 141 are adapted to open completion of the circuit through opposite supply line 143. Lines 130 and 131 also supply electric power to a totalizing count relay 145, stack count relays 146 and 147, pulsing or sheet count relays 148 and 149 and manual alternator switches 150 and 151. Switches 150 and 151 are of the dual contact type wherein contacts 152 of switch 150 are connected by line 153 to the stack counter 156 to complete a circuit by line 154 when a number of sheets, such as 42 sheets, have been recorded. Contacts 155 of switch 150 are adapted when engaged to complete a circuit from supply line 130 to line 156 which establishes a circuit to disrupt the operation of a sheet handling member, such as the member 36, and immediately start operation of the second handling member, such as the member 37. Utility of lines 154 and 156 is discussed in connection with FIG. 9. This is also true of the alternator switch 151 which through contacts 157 and line 158 complete a circuit by line 159 from the stack counter 147 or through normally open contacts 160 complete a circuit from supply line 130 to line 161.

The automatic reversal of operation between the sheet handling members 36 and 37 is obtained by self-resetting counting relays 146 and 147, suitably connected to service lines 130 and 131 and adapted to be activated in one way or another by the respective members 36 or 37. Each stack counter 146 or 147 is adjusted to record the desired total or given number of glass sheets to be stacked in a substantially vertical position on one side of a buck and, after putting the idle handling member into operation, or when manually rendered inactive, to reset itself to "zero." Associated with the counter relays 146 and 147 are pulsing or sheet counting relays 148 and 149 through lines 165–167 and 166–168, respectively. One novel feature of the invention resides in this provision since it is realized that inadvertent breakage of the glass sheets will occur and that in such emergency the stacking of the subsequent sheets should be transferred immediately to a buck at the opposite side of the conveyor.

Accordingly, each stack counter 146 and 147 records only the total of the desired given number of stacked sheets and then resets to "zero" while the pulsing or sheet counters 148 and 149 record the number of sheets stacked and when rendered inactive maintain the recorded number of sheets stacked before an emergency arises. To illustrate, in the event that a sheet is found to be broken after handling member 36 has stacked any number less than the total given number of sheets, as for example 42 sheets, on one side of a buck 24, the handling member 37 is put into operation to stack sheets on one side of a buck 25. Unless similar breakage occurs during this cycle of operation, handling member 37 completes the stacking of a desired total of 42 sheets and then initiates a new cycle of operation of the handling member 36. However, when operation of the member 36 is resumed, there will be only 30 sheets, by way of example, on the buck 24 and an additional 12 sheets must be stacked to complete a full count. Therefore, when operation of the member 36 is resumed the sheet counting relay 148 associated with the member 36 will start with the recorded count of 30 sheets and continue through the stacking of the remaining 12 sheets to register until the desired total of 42 sheets is reached. At this time, the counter 148 will activate counter relay 146 through line 167 to idle the handling member 36 and activate the member 37 in the normal manner. Of course, at this time, both counters 146 and 148 automatically reset to "zero."

Stack count relays 146 and 147 are connected to totalizing count relay 145 by line 164. Also, stack count relay 146 and sheet count relay 148 are adapted to be activated upon completion of a circuit through the line 165; said circuit being activated each time a sheet is placed in stacked relation on a storage buck. This is also true with regard to the circuit of line 166 connecting to stack count relay 147 and sheet count relay 149.

Figures 10, 11:
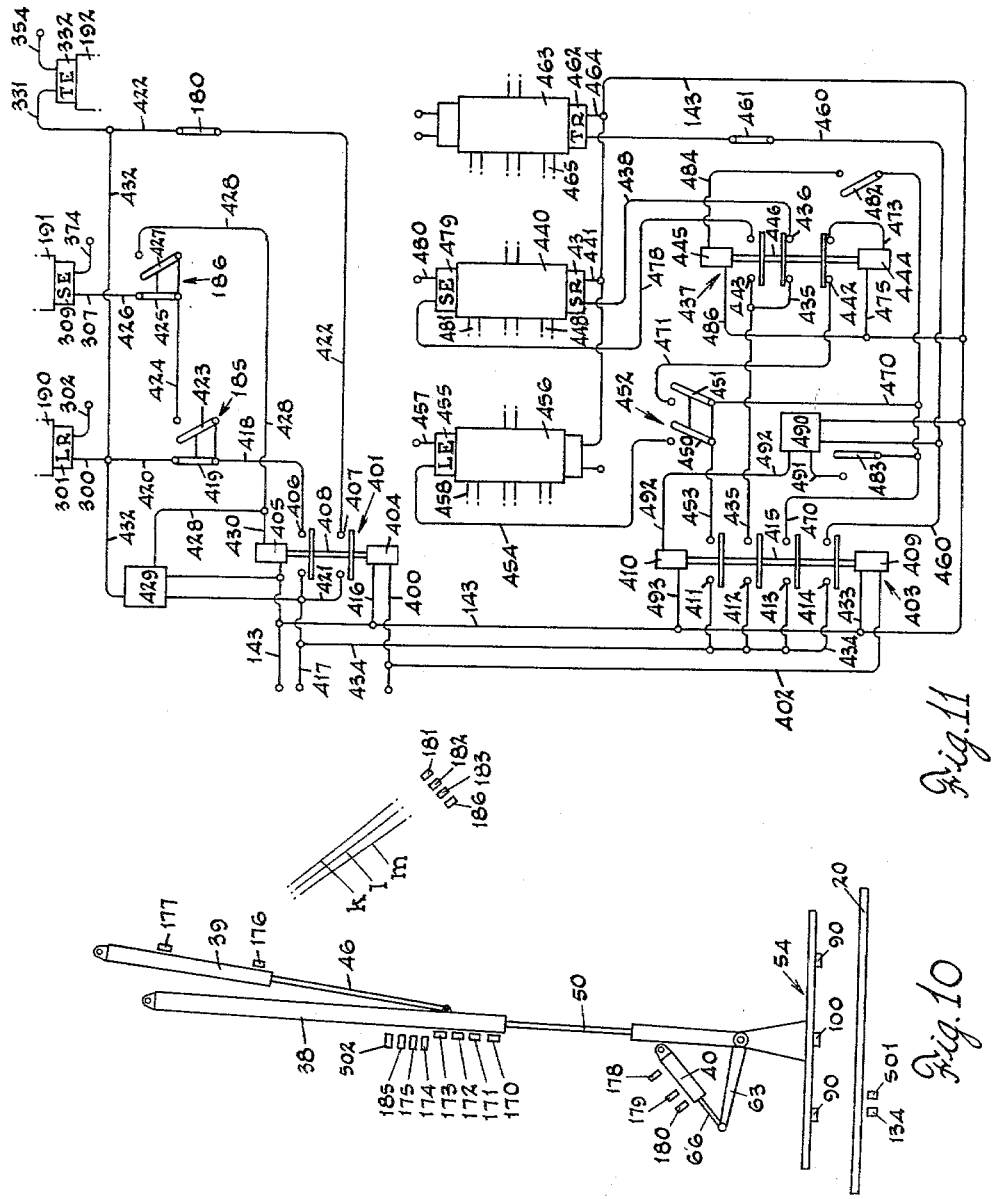
FIG. 10 is a diagrammatic view of one arrangement of control switches employed in the electrical system of FIG. 9.
FIG. 11 is a further diagrammatic view of an electrical system employed in connection with the sheet handling members.

Referring now to FIG. 10, there is shown a plurality of limit switches in generalized arrangement of their mounting on the framework 30 and the respective cylinders of particularly the handling member 36; it being appreciated that similar limit switches are provided for the member 37. Thus, limit switch 134 is shown in mounted relation to the conveyor 20 and limit switches 90 and 100 on vacuum frame 54. Limit switches 170, 171, 172, 173, 174 and 175 are mounted for operation by the cylinder 38 and/or the piston rod 50 thereof. Limit switches 176 and 177 are similarly mounted with reference to cylinder 39 and piston rod 46 while switches 178, 179 and 180 are operatively associated with the cylinder 40. Limit switches 181, 182 and 183 are supported as by a panel 184 (FIG. 4) on the framework 30.

Figure 9:
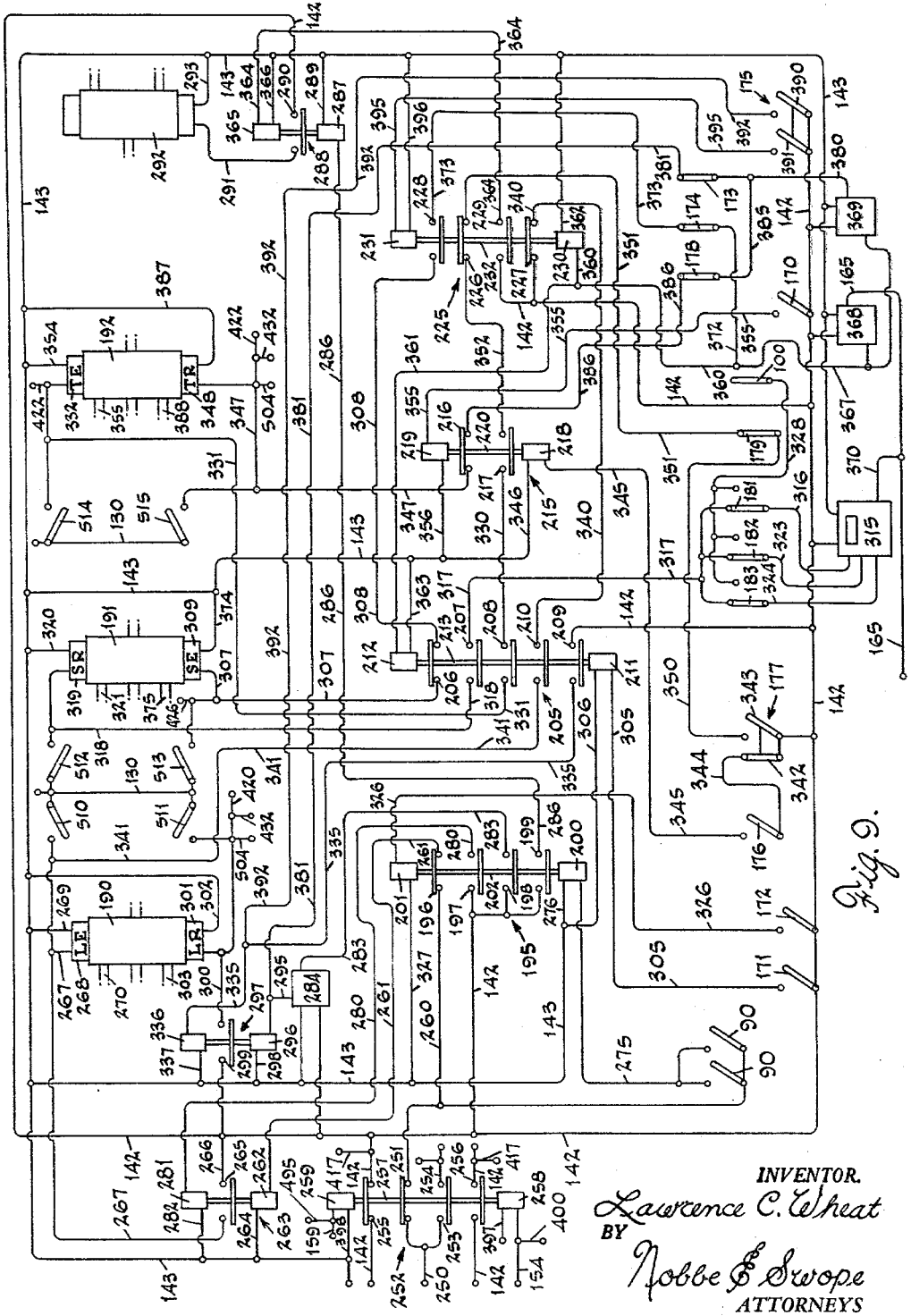
FIG. 9 is a diagrammatic view of the electrical and hydraulic systems employed in the operation of one of the sheet handling members of the apparatus.

In this connection, it will also be noted in FIG. 9 that an electrically reversible valve 190 is provided for the cylinder 38 and similar valves 191 and 192, respectively, for the cylinders 39 and 40. Likewise, a number of double-action relay switches are operatively associated with the valves 190, 191 and 192 to activate the same in sequentially arranged phases of a cycle of operation for either the sheet handling member 36 or 37. Generally stated, the switches and valves of FIG. 9 incorporate a system controlling one of the handling members, such as the member 36, with a duplicate system being provided for the other of the handling members; means in the form of control switches, to be hereinafter described, being included in the illustrated diagrams for the purpose of automatically and/or manually effecting alternate operations of the sheet handling members.

Thus, the relay switch 195 is provided with normally closed pairs of contacts 196, normally open pairs of contacts 197, 198 and 199 and solenoids 200 and 201 for reversing the position of armature 202. Likewise, relay switch 205 has a normally closed pair of contacts 206, normally open pairs of contacts 207, 208, 209 and 210, together with solenoids 211 and 212 for operating armature 213. Relay switch 215 has a pair of normally closed contacts 216, a pair of normally open contacts 217 and solenoids 218 and 219 effecting operation of the armature 220. Relay switch 225 is equipped with pairs of normally closed contacts 226 and 227, pairs of normally open contacts 228 and 229 with solenoids 230 and 231 for alternately operating armature 232. These relay switches are caused to open and close the several circuits through the contacts thereof by means of the limit switches and other electrical control devices, certain of the same being diagrammatically shown in FIG. 10 in their mounted positions on the cylinders 38, 39 and 40 of the handling member 36 or on the frame structure 30; it being appreciated that like limit switches are similarly mounted on the cylinders 70, 71 and 72 of the handling member 37. Likewise the necessary electrical control devices at a monitor station are diagrammatically shown in FIG. 8, with communicating electrical leads being identified by the same legend or numeral in either of FIGS. 9, 10 and 11.

As shown in FIG. 8, the manual switch 132 completes the circuit through line 133 to limit switch 134 (FIG. 4) that is mounted on the frame of conveyor 20 and adapted to be closed when depressed by a sheet of glass 26 received on the rolls of conveyor 20. Now, when limit switch 134 is engaged, line 133 is completed by line 235 to the solenoid 236 of spring biased relay switch 237; said switch having normally closed contacts 238 and normally open contacts 239. Closed contacts 238 normally complete a circuit from service line 130 and line 240 to an electromagnetic clutch 241 and thence by line 242 to service line 131; said clutch being associated with shaft 243 to drive the rolls of conveyor 20 from a motor source (not shown). Thus, when switch 134 is temporarily closed, a circuit is completed by lines 133 and 235 to solenoid 236 and thence by line 244 to opposite service line 131. Solenoid 236, when energized, moves armature 245 to open contacts 238 thereby disengaging clutch 241 and simultaneously closing contacts 239 to complete the circuit of motor shaft brake 246 through lines 130, 247 and 248 to opposite service line 131. This halts the immediate glass sheet 26 on the conveyor 20 to be properly engaged by the vacuum cups 80 on frame 54 of sheet handling member 36, said member being shown and described in operation in connection with FIG. 2.

Also by line 250 from line 235, closure of switch 134 completes a circuit (FIG. 9) through presently closed contacts 251 of relay switch 252; said switch 252, for purposes to be hereinafter more fully explained, is also provided with open contacts 253, connecting to line 254, and is reversed during automatic alternation of the operation of the handling members 36 and 37. In this connection, it is also to be noted that relay switch 252 is additionally equipped with closed contact pair 255 and open contact pair 256 and the armature 257 thereof is shifted by oppositely disposed solenoids 258 and 259. Closed contacts 255 complete a circuit of supply line 142 to the individual operational system of one handling member, such as the member 36, while contacts 256, when engaged, carry out the same function for the system of the alternate handling member.

Contacts 251 of relay switch 252 connect line 250 through line 260 to closed contacts 196 of relay switch 195 and by line 261 to the solenoid 262 of a double-action relay switch 263 and thence by line 264 to opposite supply line 143. Closure of contacts 265 of switch 263 operates to complete a circuit from supply line 142 by line 266 to line 267 and the LE (lift extend) side 268 of valve 190 and to supply line 143 by line 269. Valve 190 now directs pressure through pipe 270 to the upper end of cylinder 38 to extend and force piston rod 50 outwardly. This acts to lower vacuum frame 54 toward the glass sheet 26 and consequently the cups 80 into engagement with the upper surface thereof. As pointed out above, continued downward movement of the frame is absorbed by the springs 96 and until the levers 91 of limit switches 90 are swung to produce the closure thereof.

Switches 90 are connected in parallel to circuit line 260 from relay switch 252 and thus either or both of the switches will complete a circuit by line 275 to the solenoid 200 of relay switch 195 and through line 276 to supply line 143. Armature 202 is thereby moved to open contacts 196 and the circuit of lines 260 and 261 to de-energize solenoid 262 of relay switch 263. On the other hand, closure of contacts 197 completes a circuit from supply line 142 and by line 280 to the opposed solenoid 281 of switch 263 and thence by line 282 to line 143. This operates to open contacts 265 thereby rendering valve 190 idle and halting further extension or downward movement of the piston rod 50 and vacuum frame 54. Simultaneously with closure of contact pair 197, pairs of contacts 198 and 199 are closed. Contacts 198 complete a circuit by line 283 to timing relay 284; said relay being in series with supply lines 142 and 143 and setting up a predetermined time interval before the frame 54 is raised.

Contacts 199, on the other hand, complete a circuit from supply line 142 and line 286 to solenoid 287 of double action relay switch 288 and thence by line 289 to oppposite supply line 143. Contacts 290 of this relay complete a circuit from line 142 by line 291 to vacuum valve 292 and by line 293 to line 143 thereby establishing a vacuous condition in each of cups 80 to adhere the sheet 26 thereto. For reasons to be hereinafter more fully disclosed, the valve 292 when inactive is adapted to direct low pressure air to the supply pipes for the vacuum cups 80.

When relay 284 times out, a circuit is completed by line 295 to solenoid 296 of relay switch 297 and by line 298 to line 143. The contacts 299 of switch 297 are adapted to complete a circuit from supply line 142 and line 300 to the opposite LR (lift retract) end 301 of valve 190 and by line 302 to line 143. Reversal of valve 190 directs pressure by pipe 303 to the lower end of cylinder 38 with resultant retraction or upward movement of the frame 54 by piston rod 50. This permits the springs 96 to move the several cups 80 relative to the frame 54 which results in the opening of switch 90. As piston rod 50 moves inwardly of cylinder 38, the limit switch 171 (FIG. 10) is engaged. Closure of this switch completes the circuit of solenoid 211 of relay switch 205 through lines 305 and 306 from line 142 to line 143. Resultant movement of armature 213 opens pair of contacts 206 to break a circuit of line 307 through line 308 from the presently open contact pair 228 of relay switch 225 to the SE (swing extend) end 309 of valve 191.

Upon closure of contact pair 207 of relay switch 205, a circuit is completed from line 142 through an increment or step counting relay 315, line 316, presently operable limit switch 181 and line 317, contacts 207 and line 318 to the opposite SR (swing retract) end 319 of valve 191 and thence by line 320 to line 143. Valve 191 thus directs pressure through pipe 321 to the outer end of cylinder 39 to retract and move the piston rod 46 thereof inwardly and consequently swing the cylinder 38 in the direction of the arrow designated by numeral 322 in FIG. 2.

As aforementioned, limit switch 181, together with limit switches 182 and 183, is mounted by panel 184 on the side of framework 30 toward which the handling member 36 is swingably moved. The contacts of these three switches are normally closed. However, the circuits therethrough are effected by the increment or step counting relay 315 which is adapted to progressively complete the circuits through one of the switches 181, 182, 183 while maintaining the circuits open through the remaining switches. This is particularly important since with the placement of each successive sheet, the thickness of the stack of sheets is increased and the required distance of outward and upward swinging movement of the handling member proportionately decreased. Stated otherwise, the angle of upward swing of the handling member and the outward movement of the vacuum frame carried thereon is determined by desired placement of the lower edge of a sheet on the buck platform 313. As the stack thickness increases from the inclined wall 314 of the buck, the desired surface contact of a subsequent sheet occurs earlier in the outward movement of the frame and consequently the lower edge of the sheet will be spaced higher from the buck platform 313. To avoid breakage of the glass by dropping, upon release of the vacuum and from an undesired height above the platform 313, increment or step counting relay 315 reduces the angle of upward swing of the handling member, as indicated by the angularly disposed lines, designated by the letters *k*, *l* and *m* as in FIGS. 2 and 10, and thereby maintains the height of the lower sheet edge from the buck platform within suitable limits. This is diagrammatically indicated by the "saw tooth" line, designated by the letter g in FIG. 7, wherein it can be seen that the lower edge h of each sheet will be initially located slightly higher than the height at which the lower edge of a preceding sheet was placed. Thus, when the vacuum at cups 80 is relieved, upon engagement of limit switch 100, outward movement of the frame 54 is also halted and the sheet slides downwardly until the lower edge h rests on the felt covered surfaces of the platform 313.

Accordingly, the step counting relay 315 is adjusted to complete a circuit through lines 316 and 317 through limit switch 181 during the stacking of a number of sheets comprising, for example, one-third of the total of sheets to be stacked; to then complete a circuit by line 323 through limit 182 during the stacking of a second one-third of the total and to finally close line 324 through limit switch 183. Each instance, opening of the circuit of lines 316, 323 or 324 to line 317 will break the effective circuit to the SR end 319 of valve 191 to halt further outward and upward swinging movement of the associated handling member. Consequently, as the circuits of line 317 through limit switches 181, 182 and 183 are rendered idle, the swinging movement of the handling member will be reduced and the height of the sheet, when released from the vacuum frame, held within the necessary limits to prevent breakage. Opening of the circuit of line 317 at any of switches 181, 182 or 183 also completes a line 328 to limit switch 100.

After engagement of limit switch 171 and ultimate release thereof as the rod 50 progresses inwardly, a similarly mounted limit switch 172 is engaged to complete a circuit from line 142 via line 326 to the opposed solenoid 201 of relay switch 195 and thence by line 327 to line 143. Energization of solenoid 201 operates armature 202 to reclose contacts 196 and likewise open pairs of contacts 197, 198 and 199 thereby conditioning the circuits of lines 261, 280, 283 and 286 for subsequent utility in proper sequence.

Contacts 208 of relay switch 205 complete a circuit from line 330 to line 331 which would establish an active circuit to the TE (tilt extend) end 332 of valve 192 except for the fact that line 330 connects to presently open contacts 217 of relay switch 215. Pair of contacts 209, on the other hand, complete a circuit from line 142 through line 335 to opposed solenoid 336 of relay switch 297 and thence by line 337 to line 143 thereby opening contacts 299 to halt further upward movement of frame 54 upon opening the circuit of lines 142 and 300 to the LR end 301 of valve 190. However, upon closure of contact pair 210 of switch 205, a circuit is completed from service line 142 through presently closed contacts 227 of switch 225, line 340, contacts 210 and line 341 to line 267 thereby activating LE end 268 of valve 190 to bring about extension or outward movement of piston rod 50.

During this course of events, retraction or inward movement of piston rod 46 releases limit switch 176 allowing the contacts thereof to close. Continued retraction of rod 46 then effects opening of contacts 342 and the closure of contacts 343 of limit 177. However, closure of limit switch 176 during initial inward movement of piston rod 46 and in advance of actuation of limit switch 177, a circuit is established from line 142, contacts 342, line 344, switch 176, line 345 to solenoid 218 of relay switch 251 and to line 143 by line 346. When solenoid 218 is thus energized, armature 220 acts to disengage contacts 216 thereby opening the circuit of line 347 to the TR (tilt retract) side 348 of valve 192 but the contacts 217 then become adapted to complete a circuit which originates from line 142, through the presently closed contacts 343 of switch 177, line 350, presently closed limit switch 179, line 351, presently engaged contacts 226 of relay switch 225, line 352, contacts 217 of relay switch 215, line 330 through presently closed contacts 208 of switch 205 and by line 331 to the TE end 332 of valve 192 and thence by line 354 to line 143. Pressure is thus directed through valve 192 and pipe 355 to the inner end of cylinder 40 thereby causing extension of piston rod 66 to swing lever 63 on axis of pin 62 thereby tilting the frame 54 from a substantially horizontal plane in which it received the glass sheet 26 to an angular plane as indicated by the broken line position of FIG. 2 and in which plane the sheet can be placed in stacked relation to the sheets previously placed on the buck. The optimum angle is determined by the position of the limit switch 179 and the point at which it is opened during outward movement of the piston rod 66. The circuit of lines 350 and 351 being opened at this switch (179) results in idling of the valve 192 and consequent stoppage of the frame 54 at the desired angle.

The extent of upward swinging movement of the cylinder 38, as produced by operation of the cylinder 39 and retraction or inward movement of the associated piston rod 46, is controlled by the series of limit switches 181, 182 and 183. As above mentioned, the circuitry of this series of switches is completed through an increment or step counting relay 315 and is for the purpose of limiting movement of the frame 54 either as it is swung outwardly by action of the cylinder 39. These movements are limited in order that after a number of sheets have been loaded on a buck, such as one-third of the total number, for example, the general upward movement of the frame 54 is shortened and when a further like number of sheets have been placed on the buck, said outward and upward movement is further shortened. The sheets of the first third of the total will thus be placed on the storage buck with the lower edges thereof progressively slightly higher from the platform of the buck, as indicated by the "saw tooth" line g of FIG. 7. This is repeated in the placement of the remainder of the sheets and is thus compensated for by the counting relay 315.

For this purpose, the step counting relay is activated as each sheet is placed on the stack and will initially complete a circuit by line 316 through switch 181. When the relay 315 has counted the desired number of sheets, the circuit of line 316 to the switch 181 will be rendered inoperable whereupon the circuit established by line 323 will be competed through switch 182. Likewise, when the circuit of switch 182 is rendered inoperable, the switch 183 is put into service. As shown in FIG. 9, these switches are inversely located to the end that switch 183, and then the switch 182, is passed before the switch 181 is actively engaged to halt operation of the related handling member. Practically stated, the switch 181 will be engaged during the stacking of one-third of the 42 sheets or 13 sheets. The counting relay then opens the circuit of lines 316 and 317 through switch 181 and completes the circuit of line 323 to switch 182 whereupon a second group of 13 sheets will be stacked. During stacking of the remainder of the sheets of the desired total, as of 42 sheets, the switch 183 is made active to maintain completion of the circuit of lines 324 and 317. As aforementioned when any of switches 181, 182 and 183 are disengaged, control of the SR end 319 of valve 191 through the circuit of line 317, contacts 207 of relay switch 205 and line 318 will be broken.

Before the frame 54 reaches the extremity of its outward movement, the piston rod 50 effects the closure of limit switch 170 which completes a circuit from supply line 142 by line 355 to opposed solenoid 219 of relay switch 215 and thence by line 356 to opposite supply line 143. Energized solenoid 219 reverses position of armature 220 to open contact pair 217 and reclose pair of contacts 216. This operates to break the circuit of lines 330–352 with resulting halting of the tilting movement of frame 54 by cylinder 40 and at valve 192.

As the frame reaches the extremity of its movement the sheet 26 is gently urged into substantially full surface contact with the previously placed sheet and the cups 80 are moved relative to the frame against the pressure of springs 96. The centrally located limit switch 100 is now closed by its lever 101 to complete a circuit from supply line 328, and by line 360 to the solenoid 230 of relay switch 225 and the solenoid 212 of relay switch 205 by line 361 and to supply line 143 by lines 362 and 363 respectively. In the first instance, the solenoid 230 acts by armature 232 to disengage the circuit of lines 351–352 at contacts 226 and the circuit of lines 142–340 at contacts 227. Presently closed pair of contacts 229 complete a circuit from supply line 142 by line 364 to the opposed solenoid 365 of relay switch 288 and thence by line 366 to opposite supply line 143. This operates to open contacts 290 to open the circuit of lines 142–291 thereby closing valve 292 to reduce the vacuum at the cups 80; however, when the valve 292 is closed to the source of vacuum, the low pressure air directed to the cups 80 is sufficient to urge the same from the glass surface with consequent rapid separation of the glass sheet.

By branch line 367 from line 360, limit switch 100 also activates a pair of timers 368 and 369; both timers being in series with supply lines 142 and 143. Timer 368 becomes first activated to establish a circuit by line 165 to stack counting relay 146, in the present instance, to associated increment or sheet counting relay 148 and by line 370 step counting relay 315. The increase by one sheet is thus recorded against the predetermined total in relay 146 and the increase toward the desired fraction of the total is recorded stepwise in the relay 315. Counting of the sheets by relay 148, on the other hand, will, as above mentioned, become important only in the event of an emergency.

While timers 368 and 369 are inactive, a circuit is completed from line 360 and branch line 372 through presently closed limit switch 174 and by line 373 through presently closed contacts 228 of relay switch 225 and by line 308 through reclosed contacts 206 of relay switch 205 to line 307 connecting to SE side 309 of valve 191 and thence by line 374 to line 143. This operates to direct pressure by pipe 375 to the inner end of cylinder 39 whereupon piston rod 46 is extended or urged outwardly to swing the cylinder 38 in the direction of the arrow designated by the reference numeral 376. This also causes opening of contacts 343 and closure of contacts 342 of limit switch 177 whereby the circuit of line 344 to presently opened limit switch 176 is completed while at the same time the circuit of line 350 to limit switch 179 is opened.

Timer 369 subsequently becoming active completes a circuit to initiate the retracting or inward movement of the piston rod 50 and also the swinging of the vacuum frame 54 to its original position. For this purpose, said timer by line 380 completes a circuit through presently closed limit switch 173 and by line 381 to line 295. This will re-energize solenoid 296 of relay switch 297 to close contacts 299 thereby completing the circuit of lines 142 and 300 to LR end 301 of valve 190 and thence by 302 to line 143. By line 385 through presently closed switch 178 and line 386 to and through contact pair 216 of relay switch 215 a circuit is completed by line 347 to TR side 348 of valve 192 and thence by line 387 to supply line 143. This acts to direct pressure by pipe 388 to the outer end of cylinder 40 whereupon piston rod 66 is retracted or moved inwardly and lever 63 will be operated to swing the frame 54 to the plane parallel to the surface of the glass sheet subsequently received on the conveyor 20. Limit switch 178 was released to a closed position when the piston rod 66 moved outwardly and consequently is engaged to cause re-opening thereof as the rod reaches the inner end of its movement and the frame 54 is properly located.

At the end of outward movement of the piston rod 46, limit switch 176 is re-opened and engagement of limit switch 175 by cylinder 38 effects the closure thereof to connect circuits by pairs of contacts 390 and 391. In the first instance, a circuit is completed through contacts 390 from line 142 to line 392 connecting to line 335 and thus reversing switch 297 by energizing solenoid 336. This effects opening contacts 299 whereby the direction of pressure from valve 190 to the outer end of cylinder 38 is halted. Contacts 391 complete a circuit from line 142 and via line 395 to energize solenoid 231 of relay switch 225 and thence by line 396 to line 143. This will reverse the armature 232 to re-open pairs of contacts 228 and 229 while reclosing contact pairs 226 and 227. The entire control system is now arranged in its original condition preparatory to subsequent operation when a successive glass sheet 26 is received on the conveyor 20 and activates the limit switch 134.

As previously pointed out, in normal operation, the stack counting relay 146, associated with sheet handling member 36, records the placement of a predetermined number of sheets, such as 42 sheets, on one side of the storage buck 24. When this total is recorded, the counter causes the completion of a circuit from line 130 through lines 153 and 154 (FIG. 8) to the solenoid 258 of relay switch 252 and thence by line 397 to opposite supply line 143. A circuit through line 164 is also completed from stack counting relay 146 to the total count relay 145 thereby increasing the total number of sheets received from the conveyor 20 and transferred to support apparatus or bucks located at the opposite sides thereof.

The pairs of contacts 251 and 255 of relay switch 252 are thereby disengaged to open the circuits of lines 250 and 142 whereupon the automatic circuitry of the electric system associated with the sheet handling member 36 is rendered idle. Solenoid 258 also effects closure of contact pairs 253 and 256 to complete a circuit from line 250 to line 254 to activate the automatic control system associated with the cylinders 70, 71 and 72 and the counting relays of the sheet handling member 37 and also complete the service of supply line 142. Thus, the subsequent sheets 26 received on the conveyor 20 will successively actuate the limit switch 134 which while halting the conveyor 20, will also activate the sheet handling member 37 through the circuit created by lines 250 and 254 through contacts 253 of relay switch 252. The buck 24 can then be mechanically turned on turntable platform 22 to present an empty side for ultimate stacking of sheets or be removed for replacement by a buck that is empty on both of its sides. When the desired given number of sheets have been placed on one side of a buck; such as the buck 25, the recorded count made in relay 147 will cause the same to complete a circuit from lines 158 and switch 151 through line 159 to the opposed solenoid 259 of relay switch 252 and thence by line 398 to line 143. This will reverse the contact pairs of the switch whereby contacts 253–256 will be opened and the contacts 251–255 adapted to re-establish the circuit of lines 142 and 260 and thus cause the sheet handling member 36 to resume its alternate cycle of the stacking operation.

The utility of the pulsing or sheet counting relays 148 and 149 has been briefly referred to in an earlier portion of this description. It is, however, believed worthy of note that in the event of inadvertent breakage of a glass sheet, as when the same is being handled by the member 36, the recorded number of the last sheet placed on one side of the buck 24 will remain in register. In the event of such an emergency, the attending personnel immediately employs switch 150 to open the series circuits to relays 146 and 148 through contacts 152 and close similar circuits through contacts 155 to complete the circuit of line 156 from supply line 130 through line 154 to solenoid 258 of relay switch 252 (FIG. 9). The relay 146, particularly, automatically resets to zero while relay 148 retains the last count, as for example, of 30 sheets. This action on the part of the supervisory personnel, and upon closure of the contacts 155 of switch 150, replaces the automatic transfer of operation by the relay 146 and influences the contacts 253 of the relay switch 252 to complete the circuit of lines 250 and 254 with resultant operation of handling member 37. Manual switch 150 is then reversed to disengage contacts 155 and re-engage contacts 152 for subsequent operation by relay 146 through line 153. Also as aforementioned, when a full count as of 42, has been recorded in stack counting relay 147, the same will automatically shift the stacking operation from member 37 to handling member 36 upon completion of the circuit through lines 158 and 159.

In ordinary sequences of alternating cycles of operation, the stack counting relay 146 resumes its count, however, when an emergency has arisen and the relay is restored to zero, the resumption of its activity would be against a full count of 42 sheets whereas only 12 sheets are required to complete the stacking on the side of a buck at which breakage of a sheet occurred. Consequently, the pulsing or sheet relay 148 and the increment or step relay 315 become the count control mediums and register from 31 to 42 sheets after which relay 148 becomes effective to activate the counter relay 146 through line 167 and therethrough produce operation of the relay switch 252 through line 154 to close contact pairs 253–256 after opening contact pairs 251–255. The full count is thus obtained and the use of the alternate handling member is automatically obtained. Without repetition, the increment counter 149 carries out the same manner of operation so that the transfer of glass sheets from the conveyor 20 to a buck 24 or 25, in cases of emergency, can be manually obtained during the actual operation of either of the handling members 36 or 37.

Now, assuming that the handling member 36 has fully completed the stacking of sheets on one side of a buck, such as the buck 24, and the handling member 37 is to be put into operation, it becomes necessary to move the handling member 36 to its rest position on the support structures 104 while simultaneously removing said member 37 from the rest position on the support structures 105, in which it is shown in FIG. 2, and before the arrival of a subsequent sheet on the conveyor 20. This is conveniently accomplished by a circuit such as the one illustrated in FIG. 11 and during reversal of the relay switch 252 and is put into effect by a circuit completed through branch line 400 from line 154 connecting to relay switch 401 in one instance and line 402 connecting to relay switch 403 in the second instance. Relay switch 401 is equipped with opposed solenoids 404 and 405 and with pairs of contacts 406 and 407 presently disengaged by armature 408. Relay switch 403 is likewise equipped with opposed solenoids 409 and 410 and has pairs of contacts 411, 412, 413 and 414, presently disengaged by armature 415.

The handling member 36 is moved directly to its support structures 104 when a circuit is completed from service line 130, through line 400, to the solenoid 404 of relay switch 401 and thence by line 416 to supply line 143; said solenoid being energized moves armature 408 to engage pairs of contacts 406 and 407 whereby circuits will be established from contacts 256 (FIG. 9), lines 142 and line 417, contacts 406 of relay switch 401 and line 418 to the contact pair 419 of the dual limit switch 185. This circuit is completed by line 420 to line 300 at the LR end 301 of valve 190 and thence by line 302 of opposite source line 143. From its fully extended position with reference to the buck 24, the frame 54 is retracted by the piston rod 50 when pressure is directed through pipe 303 from valve 190. Meanwhile, a circuit is completed by branch line 421, contacts 407 and by line 422 through closed limit switch 180 (FIG. 10) to line 331 and the TE end 332 of valve 192 and thence by line 354 to supply line 143. This acts to suitably tilt the frame 54 to a position, relative to the piston rod 50, similar to that shown in connection with the frame 73 of handling member 37 in FIG. 2. When the rod 50 has been retracted, the contact pair 419 of limit switch 185 are disengaged to open the circuit of lines 418–420 and upon closure of contact pair 423 a circuit will be established via lines 418 and 424, closed contact pair 425 of dual limit switch 186, lines 426 and 307 to the SE end 309 of valve 191 and thence by line 374 to supply line 143. This operates to swing the cylinder 38 and associated frame 54 inwardly until the rod 89 thereof is received on the upper edges 111 of the support structures 104. At this time, the contact pair 425 of limit switch 186 are disengaged while contact pair 427 are closed to complete a circuit continuing through lines 418, 424 and line 428 to intermittent timing relay 429, said relay being in series with supply lines 142 and 143. By branch line 430, a circuit is also completed to opposed solenoid 405 of relay switch 401 and thence by line 431 to supply line 143.

When the operation of intermittent timing relay 429 is initiated, a series of timed intervals are set up to cause the periodic completion of a circuit by line 432 to circuit lines 300 and 331. This actuates the associated ends of valves 190 and 192 to maintain hydraulic pressure in the affected ends of the cylinders 38 and 40 thereby compensating for any loss in the system which could permit relaxation of the handling member. As pointed out above, normally expected losses in pressure would cause the frame weight of the handling member to move from the related support structure and undesirably enter the transfer area. When solenoid 405 is energized, the circuits of lines 417–418 and 421–422 through contacts 409 and 410, respectively, are opened and the circuitry for automatically moving a handling member, such as the member 36, to the rest position is rendered inactive, except for activity of the intermittent timing relay 429.

Simultaneously with the above-described movement of one handling member, such as the member 36, to it rest position, the opposite handling member, such as the member 37, is immediately removed from the support structures 105 and, by pressure to the cylinders 70, 71 and 72 thereof, is moved into the transfer area. This is achieved upon energization of solenoid 409 of relay switch 403 by the circuit through line 402 and line 433 to supply line 143. The contact pairs 411, 412, 413 and 414 of relay switch 403 are connected by line 434 to active supply line 417. Thus, a circuit is completed from line 434, contacts 412, line 435 through closed contact pair 436 of relay switch 437, line 438 to the SR end 439 of valve 440 and thence by line 441 to opposite service line 131. Relay switch 437 is also equipped with closed contact pair 442, open contact pair 443 and opposed solenoids 444 and 445 which operate armature 446.

Valve 440 is connected by pipe 448 to the outer end of cylinder 71 whereupon pressure will act to retract the associated piston rod thereby swinging the cylinder 70 outwardly. This operates to move the vacuum frame 73 sufficiently for the associated bar 89 to clear the ends of the support structures 104 and the contact pairs 450 and 451 of a dual limit switch 452 are thereby closed. Contacts 450 complete a circuit from line 434, contacts 411 of relay switch 403, lines 453 and 454 to the LE end 455 of valve 456 and by line 457 to supply line 143. This valve by pipe 458 directs pressure to the inner end of cylinder 70 whereupon the piston rod thereof is extended to lower the vacuum frame 73. Contact pair 414 complete a circuit from line 434 and line 460 through closed limit switch 461 to the TR end 462 of valve 463 and thence by line 464 to supply line 143. Pressure through pipe 465 operates at the outer end of cylinder 72 to swing the vacuum frame 73 into proper position for subsequent engagement with a glass sheet on the conveyor 20; the switch 461 then being opened to break the circuit to valve 463.

When contacts 450 and 451 of limit switch 452 were closed upon outward movement of the cylinder 70 and the pressure through valve 456 has initiated lowering the frame 73, a simultaneous circuit was completed from line 434, contact pair 413 of relay switch 403 and line 470, contacts 451, line 471 through closed contact pair 442 of relay switch 437, line 473 and the solenoid 444 of switch 437 to line 475 and supply line 143. This operates armature 446 to open contact pairs 436 and 442 and engage pair of contacts 443 of relay switch 437 to open lines 435–438 and 471–473 and complete the circuit from line 435 through contacts 443 to line 478, SE end 479 of valve 440 and line 480 to supply line 143. Valve 440 through pipe 481 now directs pressure to the inner end of cylinder 71 thereby extending the associated piston rod and acting to swing the cylinder 70 and frame 73 inwardly to a position above the conveyor 20, whereupon the contact pairs 450 and 451 of limit switch 452 are reopened. When the lift cylinder 70 and the frame 73 carried thereby are properly positioned for subsequent engagement with a glass sheet 26, limit switches 482 and 483 are substantially simultaneously engaged to halt the inward swinging motion of the cylinder 70 and the downward movement of the vacuum frame 73.

Switch 482 completes a circuit from line 470, line 484 to opposed solenoid 445 of relay switch 437 and thence by line 486 to opposite source 143. This reverses armature 446 to disengage contacts 443 thus opening the circuit of lines 435 and 478 while re-engaging contact pairs 436 and 442 to re-establish the circuits of lines 435–438 and lines 471–473. However, since limit switch 483 is likewise engaged, the circuit lines 435–438 and 471–473 are rendered idle through the control of a delay timing relay 490. The relay is in series with lines 470 and 143 and adjusted to monitor a very short time interval for reversal of the relay switch 437 and to then activate the opposed solenoid 410 of relay switch 403 through the circuit of line 470, switch 483, lines 491, 492 and 493 to opposed supply line 143. Reversal of armature 415 of relay switch 403 disengages contact pairs 411, 412, 413 and 414 to render all of the line circuits therethrough inactive.

One sheet handling member, such as the member 36, is thus moved to its rest position on the support structures 104 and the alternate sheet handling member, such as the member 37, is removed from its rest position into the active transfer area whereby the next sheet 26 will be transferred from the conveyor 20 to a storage buck 25 on turn-table platform 23.

As each successive sheet is received on the conveyor 20 and operates the limit 134, an individual electic system, such as disclosed in FIG. 9, will be activated to produce the sequential operations of the component cylinders of the handling member 37. When the total number of sheets to be stacked on one side of a buck 25 has been registered in the stack counting relay 147, a circuit is completed via lines 158–159 through contacts 157 of manual switch 151 (FIG. 8) and a circuit is likewise completed by line 164 to the totalizing counter 145. The circuit through lines 158–159 activates the solenoid 259 of relay switch 252 (FIG. 9) to reverse the same whereupon the active electric system to handling member 37 is rendered idle while the like electric system to the handling member 36 is put into service. In the ensuing interval before the arrival of a successive sheet into the transfer area, the closure of particularly contacts 255 of relay switch 252 will complete a circuit through line 142 and line 495 to activate an electric system, duplicating that shown in FIG. 10, whereby the handling member 37 will be moved to its rest position while the alternate handling member 36 is moved into the transfer area.

It is likewise to be understood that upon breakage of a sheet, the manual switch 151 will be employed to open contacts 157 while closing contacts 160 thereby completing a circuit from service line 130, through line 161 to line 159 thereby immediately reversing relay switch 252 to render the then active handling member, such as the member 37, idle while putting the alternate handling member, such as the member 36, into service. In this situation, the increment or sheet counting relay 149 will retain the record of the sheets placed on one side of the buck 25 and will resume the remainder of the count to the stack total when the sheets are again to be transferred from the conveyor 20 to said buck.

A further monitor control for either of the handling members 36 or 37 is provided to prevent the frame, by reason of its weight, from descending toward the conveyor 20 and/or to become slightly displaced or "skewed" from its substantially horizontal plane. For this purpose, an intermittently active timing relay 500 is in series with supply lines 142 and 143 and is activated by a circuit completed through normally closed limit switches 501 and 502 by line 503. Limit switch 501 (FIG. 8) is connected to service line 130 and is adapted to be disengaged simultaneously with engagement of limit switch 134. Limit switch 502, on the other hand, may be mounted as in FIG. 10 to be similarly disengaged upon outward swinging movement of the associated handling member. The timing relay 500 is connected by line 504 to the LR end 301 of valve 190 and to the TR end 348 of valve 192 and operates to periodically activate the valves whereby pressure will be directed by pipe 303 to the lower end of cylinder 38 and by pipe 388 to the outer end of cylinder 40 of the handling member 36. This is also true in connection with the respective cylinders of the handling member 37 when the same is in operation. Accordingly, each time either handling member is again returned to its position above the conveyor 20, as shown in FIG. 2, the limit switches 501 and 502 are engaged to complete the circuit of line 503 to activate the intermittent timing relay 500. However, upon engagement of a sheet 26 with the limit switch 134 on conveyor 20 to close the same, the switch 501 is then disengaged to open the line 503. Since the switch 501 will reclose as the sheet is raised by the operating handling member, the limit switch 502 is positioned to be disengaged as the handling member is moved outwardly and upwardly to a storage buck. Accordingly, during repeated operations of the stacking apparatus the opening of line 503 operates to render the relay 500 idle. However, in the event that sheets are removed from the conveyor 16 before reaching the conveyor section 20 and idle period of the stacking apparatus is unavoidably prolonged, the relay will become active by completed line 503 to periodically complete the circuit of line 504 thereby activating the valves 190 and 192 for short intervals of time to retract the respective piston rods 50 and 66 of cylinders 38 and 40. This operates to lift the frame 54 in the event that it has descended from the desired elevation above the conveyor 20 and also to maintain the frame substantially in a horizontal plane in the event that it has swung to any slight angle. As pointed out above, the undesired descent or swing of the frame is caused by relaxation of pressure within the hydraulic system and the resulting movement of the frame due to its weight.

Switches 510 to 515 are provided in the circuitry of FIG. 9 for manual control of the cylinders of either of the handling members through the related valves. The valve 190, associated with the cylinder 38 of handling member 36, can thus be operated through the switches 510 and 511 from service line 130 during installation or subsequent adjustment of the vacuum frame 54 in relation to the conveyor 20 or a storage buck. Valve 191, likewise, can be operated to adjust the limits of angular movement of the frame 54 through the use of switches 512 and 513. Switches 514 and 515 in like manner are employed to alter the angle of the frame to initially locate the same in a substantially horizontal position above the conveyor section and/or the angle at which the frame will be dispersed with respect to the wall of the buck. It is further contemplated that rotation of the turn-table platforms 22 or 23 can be interconnected with the automatic and individual circuits of the handling members 36 and 37 to the end that as either of the handling members are moved to their rest positions on the support structures 104 or 105 the associated turn-table will be automatically turned to position the empty side of a storage buck for subsequent stacking of sheets thereupon. When both sides of a buck are loaded, suitable manual controls are employed to turn the respective platform to accessably locate the buck for removal by a lift truck.

It is to be understood that the form of the invention herewith shown and described is to be taken as a preferred embodiment of the same, and that various changes in the shape, size and arrangement of parts may be resorted to without departing from the spirit of the invention.

I claim:

1. Apparatus for selectively transferring successive sheets between a conveyor located in one plane and support apparatus located in different planes on opposite sides of said conveyor comprising a first transfer assembly stationarily mounted above the conveyor and including a vacuum frame, means connected to said frame for moving the same bodily toward and away from said conveyor, means for swinging said frame moving means with said frame between said conveyor and the support apparatus at one side of conveyor, and means for tilting said frame into and out of the plane of said conveyor and the plane of said support apparatus at one side of said conveyor; and a second transfer assembly stationarily mounted above the conveyor and including a second vacuum frame, means connected to said second frame for moving the same bodily toward and away from said conveyor, means for swinging said second frame moving means with said second frame between said conveyor and the support apparatus on the opposite side of said conveyor, and means for tilting said second frame into and out of the plane of said conveyor and the plane of said support apparatus on the opposite side of said conveyor.

2. Apparatus as defined in claim 1, in which electrically operable means are provided to successively actuate first one of said transfer assemblies to transfer a predetermined number of sheets from said conveyor to said support apparatus on one side of said conveyor and then the other of said transfer assemblies to transfer a predetermined number of sheets from said conveyor to said support apparatus on the opposite side of said conveyor.

3. Apparatus as defined in claim 2, in which said successive actuating means is automatically operable when said predetermined number of sheets has been transferred to the support apparatus at one side of said conveyor to stop the operation of one of said transfer assemblies and to initiate the operation of the other of said transfer assemblies.

4. Apparatus as defined in claim 1, in which electrically operable means are provided for automatically moving one of said transfer assemblies from a rest position into working position above said conveyor and the other of said transfer assemblies from the working position into rest position.

5. Apparatus as defined in claim 2, in which electrically operated emergency control means is provided for halting the operation of either of said transfer assemblies before said predetermined number of sheets has been transferred from the conveyor to the support apparatus on one side of the conveyor, for actuating the other of the transfer assemblies to transfer a selected number of sheets from the conveyor to the support means on the opposite side of the conveyor and for then re-actuating the first mentioned transfer assembly to transfer the remainder of said predetermined number of sheets from said conveyor to the support apparatus on the first mentioned side of said conveyor.

6. Apparatus as defined in claim 2, in which the successive actuation of the transfer assemblies is automatically and electrically controlled.

7. In apparatus for transferring successive sheets between a conveyor located in one plane and a support apparatus located in a different plane, a transfer assembly comprising, in combination, a supporting frame stationarily mounted above said conveyor, a vacuum frame for transferring the sheets, first means pivotally carried by the supporting frame and connected to the vacuum frame for moving said vacuum frame bodily toward and away from said conveyor, second means also carried by the supporting frame for swinging the first-named means and vacuum frame bodily to one side of the supporting frame, third means pivotally carried by said first-named means and connected to said vacuum frame for tilting said vacuum frame relative to said first-named means into and out of the plane of said conveyor and the plane of said support apparatus, electrically operated means on said conveyor for actuating said first-named means to move said vacuum frame bodily toward the conveyor, electrically operated means on said vacuum frame for actuating the first-named means to halt movement of the vacuum frame and for moving the same away from said conveyor, electrically operated means on said first-named means for actuating said second-named means to swing said first-named means and vacuum frame bodily to one side of the supporting frame, and electrically operated means on said second-named means for actuating the third-named means to tilt the vacuum frame relative to said first-named means.

8. In apparatus for transferring successive sheets between a conveyor located in one plane and a support apparatus located in a different plane, a transfer assembly comprising, in combination, a supporting frame stationarily mounted above said conveyor, a vacuum frame for transferring the sheets, means pivotally carried by the supporting frame and connected to the vacuum frame for moving said vacuum frame bodily toward and away from said conveyor, means also carried by the supporting frame for swinging the first-named means and vacuum frame bodily to one side of the supporting frame, means pivotally carried by said first-named means and connected to said vacuum frame for tilting said vacuum frame relative to said first-named means into and out of the plane of said conveyor and the plane of said support apparatus, electrically operated means actuated by a sheet moving along the conveyor for successively stopping the conveyor and actuating the first-named means to move the vacuum frame into engagement with the sheet, and electrically operated means actuated by movement of the vacuum frame into engagement with the sheet for successively creating a sheet-holding vacuum in said vacuum frame, raising the vacuum frame and sheet, and swinging the first-named means laterally to move the vacuum frame and sheet to one side of the supporting frame, and switch means actuated by said swinging means to tilt the vacuum frame into the plane of the support apparatus.

9. In apparatus as defined in claim 8 including electrically operated means carried by the vacuum frame and automatically actuated upon placing of the sheet on the support apparatus to successively stop the movement of said first-named means, release the vacuum to the vacuum frame and return the first-named means and vacuum frame to its position above the conveyor.

10. In apparatus as defined in claim 9, including a second vacuum frame and means for supporting and actuating said second vacuum frame in the same manner as said first vacuum frame, a counting apparatus actuated by one vacuum frame upon stopping of the first-named means to record the number of sheets transferred to the support apparatus, and electrically operated means actuated by said counting apparatus for stopping the actuation of one vacuum frame and starting the actuation of the other vacuum frame when a predetermined number of sheets have been transferred by said one vacuum frame to the support apparatus.

11. In apparatus as defined in claim 10, wherein said last-named electrically operated means comprises a relay switch and including means for automatically resetting the counting apparatus when a given number of sheets have been transferred to the support apparatus, and a second counting apparatus simultaneously actuated with said first counting apparatus to also record the number of sheets transferred, said second counting apparatus being electrically connected with said first counting apparatus to initiate operation of said relay switch when the number of sheets recorded by said first counting apparatus is less than the predetermined number of sheets recorded by the second counting apparatus.

12. In apparatus for transferring successive sheets between a conveyor located in one plane and a support apparatus located in a different plane, a transfer assembly comprising, in combination, a supporting frame stationarily mounted above said conveyor, a vacuum frame for transferring the sheets, means pivotally carried by the supporting frame and connected to the vacuum frame for moving said vacuum frame bodily toward and away from said conveyor, means also carried by the supporting frame for swinging the first-named means and vacuum frame bodily to one side of the supporting frame, means pivotally carried by said first-named means and connected to said vacuum frame for tilting said vacuum frame relative to said first-named means into and out of the plane of said conveyor and the plane of said support apparatus, a counting apparatus electrically actuated during successive swinging movements of the first-named means, and electrically operated means actuated by said first-named means during swinging movement thereof for stopping said swinging movement when a predetermined number of sheets have been transferred from the conveyor to the support apparatus.

13. In apparatus as defined in claim 12, in which said electrically operated means includes a first switch device connected to said counting apparatus for stopping swinging movement of the first-named means when a predetermined number of sheets have been transferred to the support apparatus, and second and third switch devices electrically connected to the counting apparatus for reducing the angle of swinging movement of the first-named means when the successive predetermined numbers of sheets have been transferred to said support apparatus whereby to compensate for the thickness of such predetermined number of sheets.

14. In apparatus for transferring successive sheets between a conveyor located in one plane and support apparatus arranged at opposite sides of the conveyor and located in a different plane, a transfer assembly comprising, in combination, a supporting frame stationarily mounted above said conveyor, a first vacuum frame for transferring sheets from the conveyor to the support apparatus at one side of said conveyor, a second vacuum frame for transferring sheets from said conveyor to the support apparatus at the opposite side of said conveyor, separate means pivotally carried by the supporting frame and connected to each of said vacuum frames for moving the respective vacuum frame bodily toward and away from said conveyor, means carried by the supporting frame and connected to one of said separate means for swinging said means and vacuum frame carried thereby to one side of the supporting frame, means carried by the support frame and connected to the other of said separate means for swinging said other separate means and vacuum frame carried thereby to the opposite side of the support frame, means pivotally carried by each of said separate means and connected to the respective vacuum frame for tilting said vacuum frame relative to said separate means into and out of the plane of said conveyor and the plane of the respective support apparatus, and means automatically controlling the transfer of a predetermined number of successive sheets by the first vacuum frame and then the transfer of a predetermined number of successive sheets by the second vacuum frame.

References Cited in the file of this patent

UNITED STATES PATENTS

| | | |
|---|---|---|
| 1,958,133 | Delany | May 8, 1934 |
| 1,959,216 | Owen | May 15, 1934 |
| 2,486,415 | Huntar | Nov. 1, 1949 |
| 2,579,094 | Rooksby | Dec. 18, 1951 |
| 2,698,693 | Nordquist | Jan. 4, 1955 |
| 2,831,589 | Way | Apr. 22, 1958 |
| 2,920,916 | Pagdin | Jan. 12, 1960 |
| 2,928,519 | Finston | Mar. 15, 1960 |
| 3,079,011 | Gollwitzer | Feb. 26, 1963 |
| 3,094,322 | Kocher et al. | June 18, 1963 |